United States Patent
Kessel et al.

[11] Patent Number: 5,910,623
[45] Date of Patent: Jun. 8, 1999

[54] MIXTURES OF SULFO-CONTAINING 1:2 METAL COMPLEXES WITH VINYL POLYMERS

[75] Inventors: Knut Kessel, Mannheim; Manfred Patsch, Wachenheim; Manfred Herrmann, Ludwigshafen; Kurt Reiner; Jörg Jessen, both of Speyer; Matthias Wiesenfeldt, Dannstadt-Schauernheim, all of Germany

[73] Assignee: BASF Aktiengesellschaft, Ludwigshafen, Germany

[21] Appl. No.: 08/910,669

[22] Filed: Aug. 13, 1997

[30] Foreign Application Priority Data

Aug. 20, 1996 [DE] Germany ................. 19633484

[51] Int. Cl.$^6$ .................. D06P 1/39; D06P 1/90; D06P 3/32
[52] U.S. Cl. ................... 8/402; 8/404; 8/436; 8/527; 8/553; 8/685; 8/680
[58] Field of Search ................ 8/436, 437, 404, 8/402, 506, 527, 553, 685, 680

[56] References Cited

U.S. PATENT DOCUMENTS 5,302,639  4/1994  Shimizu et al. ................ 524/86

FOREIGN PATENT DOCUMENTS

| 28 13 982 | 10/1978 | Germany. |
| 29 35 861 | 3/1980 | Germany. |
| 95762 | 10/1988 | Romania. |
| 824459 | 12/1959 | United Kingdom. |
| 2 031 448 | 4/1980 | United Kingdom. |
| 1 590 154 | 5/1981 | United Kingdom. |

OTHER PUBLICATIONS

Klotz et al., The Thermodyanmics of Metallo–protein Combinations. Copper with Bovine Serum Albumin. Journal of the American Chemical Society, pp. 939–944, Mar. 1948.

Takagishi et al., Effects of Added Metal Ions on the Interaction between Polyvinylpyrrolidone and Azo Dyes Caryying Hydroxyl Groups. Journal of Polymer Science: Part A: Polymer Chemistry, vol. 25, pp. 2511–2520 (month unknown), 1987.

*Primary Examiner*—Alan Diamond
*Attorney, Agent, or Firm*—Oblon, Spivak, McClelland, Maier & Neustadt, P.C.

[57] ABSTRACT

Liquid or solid mixtures of low-salt sulfo-containing 1:2 metal complex dyes and poly-N-vinylpyrrolidone or copolymers of N-vinylpyrrolidone and vinyl acetate are especially useful for dyeing paper and wood and also for dyeing and finishing leather and fur.

12 Claims, No Drawings

MIXTURES OF SULFO-CONTAINING 1:2 METAL COMPLEXES WITH VINYL POLYMERS

The present invention relates to liquid or solid mixtures of low-salt sulfo-containing 1:2 metal complex dyes and poly-N-vinylpyrrolidone or copolymers of N-vinylpyrrolidone and vinyl acetate.

DE-A-28 13 982 discloses a process for preparing water-soluble dyes in the form of granules by admixing an aqueous paste of the dye with an anionic surfactant and a water-soluble polymer and then spray-drying the paste. Poly(N-vinyl-α-pyrrolidone) is mentioned as a suitable polymer in claim 5. The preferred dyes are reactive dyes.

DE-A-29 35 861 describes inks comprising nigrosine and poly-N-vinylpyrrolidone, useful for inkjet printers.

Finally, Romanian specification 95762 B1 of Oct. 30, 1988, describes solutions which, as well as certain solvents, comprise a sulfo-free metal complex dye and polyvinylpyrrolidone. The solution predominantly comprises organic solvents and is diluted with further solvent for use.

Sulfonyl-containing 1:2 metal complexes are widely used for dyeing a wide range of materials, for which a user would usually like to use very specific dye solutions with very different solvent mixtures. Consequently, the present invention has for its object stable mixtures from which solids do not precipitate upon dissolution or dilution by the user.

We have found that this object is achieved by the abovementioned liquid and solid mixtures.

Poly-N-vinylpyrrolidones are well known, as are the copolymers. The mixtures of this invention advantageously utilize poly-N-vinylpyrrolidones having weight average molecular weights from about 2,000 to 60,000, preferably from 2,000 to 11,000, and copolymers with up to 40 mol %, preferably from 30 to 40 mol %, of vinyl acetate and molecular weights from 45,000 to 70,000, preferably 45,000 to 60,000.

Sulfo-containing 1:2 metal complex dyes are likewise very well known; preference with regard to the intended utilization is given in particular to cobalt and preferably chromium complexes. Particular preference is given to dyes which, from the aspect of their fastness properties, are suitable for dyeing paper and preferably wood and also fur and preferably for leather.

The complex dyes to be incorporated in the mixtures of this invention should be in a very low-salt form; that is, they should be synthesized with very little salt or be freed from the bulk of the salts after synthesis. Appropriate methods for this are known.

In the solid mixtures of the invention, the mixing ratio between complex dye and polymer depends on the desired color strength. The solid mixture generally comprises from 1 to 20% by weight, preferably from 5 to 15% by weight, of poly-N-vinylpyrrolidone or copolymer of N-vinylpyrrolidone and vinyl acetate for the purpose of setting the color strength target value; the rest of the mixture consists essentially of dye.

Solid mixtures according to this invention may include still further components, for example dustproofing agents. Suitable dust binders consist for example of certain petroleum fractions which may comprise incipiently sulfonated portions as emulsifiers.

Solid mixtures of the invention preferably include from 0.1 to 4% by weight, preferably 0.5 to 2% by weight, of dustproofing agent and from 1 to 20% by weight of poly-N-vinylpyrrolidone or copolymer of N-vinylpyrrolidone and vinyl acetate.

Solid mixtures according to this invention are advantageously prepared by mixing the complex dyes in a substantially dry form (e.g. cabinet- or preferably spray-dried) with the likewise solid (e.g. similarly spray-dried) poly-N-vinylpyrrolidone or copolymer of N-vinylpyrrolidone and vinyl acetate until homogeneity is achieved. However, it is also possible to mix the components of the mixture in a dissolved or suspended form and only then to dry the mixture.

To convert solid mixtures of this invention into stock solutions for dyeing purposes, they can be dissolved in water or, preferably, organic solvents or mixtures of water and organic solvents. Suitable organic solvents are preferably glycols, glycol ethers, glycol esters and mixtures thereof, for example 1,2-propylene glycol, 1-methoxy-2-propyl acetate, 1-methoxy-2-propanol, dipropylene glycol monomethyl ether, butylglycol or butyldiglycol.

Solid mixtures of this invention are notable for excellent solubility and outstanding suitability for dyeing paper and preferably wood. Wood is best dyed with low-water or water-free solutions because they do not swell the wood.

The liquid, predominantly water-comprising, mixtures include, based on their total weight, from 1 to 12% by weight of poly-N-vinylpyrrolidone or copolymers of N-vinylpyrrolidone and vinyl acetate and optionally organic solvents. Predominantly water-comprising is to be understood as meaning a water/organic solvent ratio greater than 1.

Organic solvents suitable for these liquid mixtures are especially water-miscible solvents such as glycols, glycol ethers, glycol esters, polyether-alkanols of ethylene oxide or tetrahydrofuran, dimethylformamide, N-methylpyrrolidone or mixtures thereof.

Preference is given to liquid predominantly water-containing mixtures including, based on the total weight, from 1 to 12% by weight of poly-N-vinylpyrrolidone or copolymers and as organic solvents glycols, glycol ethers, glycol esters, polyetheralkanols of ethylene oxide or tetrahydrofuran, dimethylformamide, N-methylpyrrolidone or mixtures thereof.

The predominantly water-comprising solutions generally include from 10 to 30, preferably from 15 to 25%, by weight of dye and from 1 to 12, preferably from 2 to 10, in particular from 3 to 7%, by weight of polymers. The rest is up to 10%, preferably from 2 to 6%, by weight of solvent and water.

The liquid predominantly water-comprising mixtures of this invention are obtained from 1:2 metal complex dyes which have been synthesized with little salt and which are present in the form of pastes, suspensions or hot solutions by mixing with solid or preferably predominantly aqueous solutions of polyvinylpyrrolidone or its copolymers.

The solvents can be added before, during or after the synthesis of the dyes or else during the formulation of the commercial form.

If a clarifying filtration is necessary, it is advantageously carried out in the presence of the solvents, but before addition of the polymers.

The liquid predominantly water-comprising mixtures, if necessary after dilution to use concentrations, are particularly useful for finishing and dyeing leather and fur.

Particular features of the liquid predominantly water-comprising mixtures of this invention are the storage stability, cold stability and favorable viscosity, and they can be used individually or else combined.

In the Examples which follow, parts and percentages are by weight, unless otherwise stated.

The following designations are used:

Polyvinylpyrrolidone of MW 2000–3000=polyvinylpyrrolidone I

Polyvinylpyrrolidone of MW 7000–11000 =polyvinylpyrrolidone II

Polyvinylpyrrolidone of MW 28000–34000 =polyvinylpyrrolidone III

Polyvinylpyrrolidone of MW 44000–54000 =polyvinylpyrrolidone IV

Copolymer of vinylpyrrolidone/vinyl acetate 60/40 of MW 45000–70000=polyvinylpyrrolidone V The dustproofing agent used was an incipiently sulfonated petroleum fraction.

EXAMPLE a 223.5 g of chloro-o-phenol acid (2-amino-4-chloro-6-sulfophenol) are suspended in 1300 ml of water and dissolved at pH 8.5 by addition of 90 g of 50% strength sodium hydroxide solution. After addition of 400 ml of half-concentrated hydrochloric acid, the mixture is cooled down to 0° C. with 1300 g of ice. 300 ml of 3.33 normal sodium nitrite solution are then run in over 30 minutes, and the diazotization takes 1 hour and affords a clear solution.

This solution is added over 30 minutes to a prepared solution of the coupling component obtained by adding 100 g of 50% strength sodium hydroxide solution to a suspension of 176 g of acetoacetanilide in 800 g of water. During the coupling, a further 800 g of ice and 1000 ml of water are added, and the coupling pH is maintained at 9.5 by addition of 30 g of 50% strength sodium hydroxide solution. The mixture warms up to 30° C., and the coupling is complete after 3 hours.

The resulting suspension is heated to 70° C., at which point 119 g of crystalline cobalt chloride dihydrate are sprinkled in. At the same time, 57 g of 30% strength hydrogen peroxide are added, and the reaction batch pH is maintained at 6 with 20 g of 50% strength sodium hydroxide solution. The batch briefly goes into solution, but, in the course of cooling, the reaction product precipitates and is isolated by filtration with suction. The amount of dye obtained is 950 g; the solids content is 50% and the salt content is below 1.5%.

EXAMPLE 1

The approximately 50% strength press cake of the dye obtained in Example a is suspended with 1900 g of demineralized water and adjusted to pH 8 with 60% strength sodium hydroxide solution. The suspension is then sieved, admixed with 10% (calculated on the yield of the spray dye) of polyvinylpyrrolidone III and spray-dried in a conventional manner by means of a two-material nozzle at an inlet temperature of 120° C. and an outlet temperature of 65° C.

The 550 g of the resulting pulverulent product comprise up to 7% of water and are dustproofed with 2% of the dustproofing agent by thorough mixing in a tumble mixer.

The result is a low-dust yellowish brown product comprising not more than 3% of inorganic salts and having very good dissolution properties in aqueous and organic solvent mixtures.

EXAMPLE 2

The approximately 50% strength press cake of the dye obtained in Example a is suspended with 1900 g of demineralized water and adjusted to pH 8 with 50% strength sodium hydroxide solution. The suspension is then sieved; thereafter it is spray-dried in a conventional manner by means of a one-material nozzle at an inlet temperature of 170° C. and an outlet temperature of 95 0° C. to a residual water content of 4%.

The resulting powder is admixed with 15% of its weight of polyvinylpyrrolidone I and homogeneously mixed with 1.5% of dustproofing agent in a turbulence mixer.

This results in 550 g of a low-dust, yellowish brown product having very good dissolution properties in aqueous and organic solvent mixtures.

EXAMPLE 3

To a mixture of 31 parts of dipropylene glycol monomethyl ether, 37 parts of 1,2-dipropylene glycol, 11 parts of methoxypropyl acetate and 6 parts of demineralized water are added a little at a time with thorough stirring 15 parts of the dustproofed dye powder prepared in Example 2. The result is a deep yellow solution which, after clarifying filtration, can be utilized for spray-dyeing, dip- and knife-coating of wood and which has high storage stability.

EXAMPLE 4

To a mixture of 31 parts of demineralized water and 50 parts of ethanol are added with stirring 50 gl of the dye powder prepared in Example 2. The result is a yellow solution which has a dissolution residue of only about 2% and which is highly suitable for spray-dyeing wood or for dyeing paper.

EXAMPLE b

To a mixture of 1000 ml of water and 500 g of ice are added 234 g of 2-amino-4-sulfo-6-nitrophenol in the form of the as-sulfonated synthesis product. 305 ml of 3.33 normal sodium nitrite solution are then added to effect diazotization, half-concentrated hydrochloric acid being added if necessary to ensure a pH of 1.5 at the end of the 45-minute diazotization.

Following addition of a further 700 g of ice, a pH 12 solution of the coupling component prepared from 1000 ml of water, 174 g of 1-phenyl-3-methylpyrazolone and 90 g of 50% strength sodium hydroxide solution is run in over 30 minutes.

The coupling suspension is admixed with 80 g of sodium acetate and with sufficient ice and water for the temperature not to exceed 5° C. and the volume not to exceed 4500 ml. After 2 hours, the coupling is complete, and the batch is divided into two equal-sized parts.

The first part is admixed with 250 ml of half-concentrated hydrochloric acid and the suspension is subsequently stirred at 8° C. and pH 1 for 2 hours. The suspension is filtered with suction through a sintered glass filter and the filter residue is washed with demineralized water to leave 645 g of a dye paste having a solids content of 30%.

The second part is admixed with 250 ml of half-concentrated hydrochloric acid, followed by 130 g of a basic chromium formate/sulfate having a chromium content of 20%. At a pH of 1 and temperatures around 135° C., the batch is pressure-chromed at 3–5 bar in a pressure apparatus over 5 hours.

Thereafter the apparatus is decompressed and the dye is isolated on a suction filter, affording, after washing with demineralized water, 470 g of a paste of the 1:1 chromium complex dye, which has a solids content of 50%.

The 645 g of the unmetallized dye paste and the 470 g of the chromium complex dye paste are suspended in 1500 g of water and heated to 90° C. As the 1:2 chromium complex dye forms, the acid which is liberated is trapped by addition of 50 g of 50% strength sodium hydroxide solution to a pH of not more than 7. 2700 g of a dye suspension comprising 17% of the red chromium complex are obtained. The salt content of the product is below 0.5%.

EXAMPLE 5

The approximately 17% strength dye suspension obtained in Example b is sieved and spray-dispensed by means of a two-material nozzle at an inlet temperature of 150° C. and an outlet temperature of 80° C.

The resulting powder is admixed with 10% of its weight of polyvinylpyrrolidone I and homogeneously mixed with 1% of the dustproofing agent in a tumble mixer.

This results in 550 g of a low-dust, red product which has excellent dissolution properties in organic and aqueous solvent mixtures; the residual moisture content is 6% and the inorganic salt content is below 3%.

EXAMPLE 6

The 17% strength dye suspension obtained in Example b is sieved and spray-dispensed by means of a one-material nozzle at an inlet temperature of 150° C. and an outlet temperature of 85° C.

The resulting powder is mixed with 20% of its weight of polyvinylpyrrolidone V, treated with 0.5% of the dustproofing agent, and everything is homogeneously mixed together in a tumble mixer.

This results in 540 g of a low-dust, red product having good dissolution properties in organic solvent mixtures; the residual moisture content is 7% and the inorganic salt content is below 3%.

EXAMPLE 7

To a mixture of 35 parts of 1-methoxy-2-propanol, 35 parts of 1,2-propylene glycol and 5 parts of demineralized water are added a little at a time with thorough stirring 25 parts of the dustproofed dye powder described in Example 5 to obtain a deep red solution which, after clarifying filtration, can be utilized for spray-dyeing wood; dip-coating and knife-coating are also possible.

EXAMPLE 8

To a mixture of 50 parts of water and 50 parts of ethanol are added with stirring 50 g/l of the dye powder prepared in Example 5. This results in a red solution which has a dissolution residue of only about 4% and is highly suitable for spray-dyeing wood or for dyeing paper.

EXAMPLE c

To a suspension of 234 g of nitramine acid (2-amino-4-nitro-6-sulfophenol) in 1000 ml of water are added 100 ml of half-concentrated hydrochloric acid, and the temperature is reduced to 0° C. by addition of 300 g of ice. 300 ml of 3.33 normal sodium nitrite solution are then run in over 30 minutes; after 30 minutes at 5–10° C. the diazotization is complete.

A further 300 g of ice are added, followed over 30 minutes at not more than 15° C. by the coupling component prepared by addition of 90 g of 50% strength sodium hydroxide solution to a suspension of 174 g of 1-phenyl-3-methylpyrazolone in 1000 ml of water. 90 g of anhydrous sodium acetate are added, so that the pH does not exceed 5, and the batch is subsequently stirred for 4 hours to complete the coupling reaction. 35 g of salicylic acid are then added, and everything is then mixed with 260 g of a basic chromium formate/sulfate having a chromium content of 20%. The batch is adjusted to pH 4 and then heated to 100° C.; the batch then dissolves over an hour in the form of a 1:2 complex when a pH of 4.5 is maintained with half-concentrated sodium hydroxide solution. The mixture is then adjusted to pH 1.8 with 400 ml of half-concentrated hydrochloric acid over 2 hours and stirred at 100° C. for 4 hours. A further 80 ml of half-concentrated hydrochloric acid are then added to adjust the pH to 1.4, and the batch is stirred under reflux for a further 4 hours until the conversion into the suspension of the 1:1 complex is complete.

After addition of a further 80 ml of half-concentrated hydrochloric acid, a pH of 1 is set, the batch is cooled down to 60° C. by addition of ice/water to a volume of 7500 ml, and then everything is isolated on a suction filter. Washing with demineralized water leaves 780 g of an orange dye paste having a solids content of 60%.

The resulting paste of the 1:1 chromium complex is introduced into a suspension of the unchromed dye obtained as follows:

295 g of 6-nitro-Boeniger acid are suspended in 1000 ml of demineralized water and mixed with 30 g of aqueous ammonia. To this is added, over 10 minutes, the solution of the coupling component prepared by addition of 120 g of 50% strength sodium hydroxide solution to a suspension of 144 g of β-naphthol in 1000 ml of demineralized water.

The temperature of the coupling mixture may rise to 50° C., while the pH within the 1-hour coupling is held at 10.5 with a further 60 g of 50% strength sodium hydroxide solution.

The batch is adjusted to pH 6 and heated to 90° C. for 2 hours; the acid which is liberated is trapped with 50% strength sodium hydroxide solution to obtain 3500 g of a brown dye solution comprising 27% of the 1:2 complex; the salt content of the material is below 0.7%.

EXAMPLE 9

The solution obtained in Example c is further processed while still hot; for this, it is first diluted with demineralized water to a solids content of 23%, sieved, and everything is spray-dispensed by means of a one-material nozzle at an inlet temperature of 160° C. and an outlet temperature of 80° C.

The powder obtained is homogeneously mixed with 8% of its weight of polyvinylpyrrolidone I and with 1.5% of its weight of dustproofing agent in a turbulence mixer.

This produces 1200 g of a low-dust brown product having a residual moisture content of 11% and an inorganic salt content of not more than 3% and very good dissolution properties in organic and aqueous solvent mixtures.

EXAMPLE 10

The solution obtained in Example c is dried in a through-circulation cabinet at 70° C. over 2 days, and the residue is ball-milled. The 1000 g of the powder thus obtained are homogeneously mixed with 11% of its weight of polyvinylpyrrolidone II and with 1.5% of the dustproofing agent in a turbulence mixer.

The resulting 1200 g of a low-dust brown product having a residual moisture content of 8% and an inorganic salt content of not more than 3% exhibit excellent dissolution properties in organic and aqueous solvent mixtures.

EXAMPLE 11

22 parts of the low-dust powder obtained in Example 9 are added a little at a time to a mixture of 39 parts of 1-methoxy-2-propanol and 39 parts of butyldiglycol with thorough stirring.

The result is a deep brown solution which, after clarifying filtration, can be utilized for spray-dyeing wood or for dip- or knife-coating same and which has high storage stability.

EXAMPLE 12

50 g/l of the dye powder prepared in Example 9 are added to a mixture of 50 parts of water and 50 parts of ethanol with stirring.

The result is a brown solution which has a dissolution residue of only about 5% and which is highly suitable for spray-dyeing wood or for dyeing paper.

EXAMPLE d 295 g of 6-nitro-Boeniger acid are suspended in 1000 ml of water and admixed with 30 g of ammonium sulfate. To this is added, over minutes, the solution of the coupling component prepared by addition of 120 g of 50% strength sodium hydroxide solution to a suspension of 144 g of β-naphthol in 1000 ml of water.

The temperature of the coupling mixture, which requires intensive stirring can rise to 50° C.while the pH during the 1-hour coupling is held at 10.5 by addition of a further 60 g of 50% strength sodium hydroxide solution.

20 g of salicylic acid are then added, and everything is admixed with 130 g of a basic chromium formate/sulfate having a chromium content of 20%. A pH of 4 is set, and then everything is heated to 100° C.; the batch dissolves over 2 hours as a 1:2 complex when a pH of 4.5 is maintained with 50% strength sodium hydroxide solution.

Over a period of 12 hours, sufficient 25% strength sulfuric acid is then added dropwise, initially rapidly, then increasingly slowly, at reflux temperature for ultimately a pH of 1 to be achieved.

The precipitated suspension is, on a molar basis, a 50/50 mixture of the unchromed dye and of the 1:1 chromium complex and is isolated with the aid of a suction filter.

Washing with demineralized water leaves a moist filter cake which has a weight of 1950 g and a solids content of 25%.

The paste is slurried up with 500 ml of demineralized water, admixed with 20 g of salicylic acid and, on heating to 90° C., admixed with sufficient 50% strength sodium hydroxide solution for everything to dissolve and a final pH of 7 to be obtained.

After 1.5 hours, 2500 g are obtained of a jet black solution comprising 20% of the 1:2 chromium complex and having a salt content below 0.5.

EXAMPLE 13

The solution obtained in Example d is poured through a sieve having 10,000 meshes/cm$^2$, admixed with 10% (calculated on the yield of the spray dye) of polyvinylpyrrolidone I and spray-dried in a conventional manner by means of a two-material nozzle at an inlet temperature of 150° C. and an outlet temperature of 70° C.

The resulting 575 g of the resulting pulverulent product comprise 5% of water and are mixed with 1.5% of the dustproofing agent by intensive mixing in a tumble mixer.

The result is a low-dust black product having an inorganic salt content of not more than 2.5% and very good dissolution properties in aqueous and organic solvent mixtures.

EXAMPLE 14

The solution obtained in Example d is poured through a sieve having 10,000 meshes/cm$^2$ and is spray-dried in a conventional manner by means of a two-material nozzle at an inlet temperature of 155° C. and an outlet temperature of 75° C. to a residual water content of 4%.

The resulting powder is mixed with 5% of its weight of polyvinylpyrrolidone V and a further 5% of its weight of polyvinylpyrrolidone II and homogeneously mixed with 2.5% of the dustprofing agent in a turbulence mixer.

This results in 575 g of a low-dust black product having an inorganic salt content of not more than 2.5% and excellent solubilities in aqueous and organic solvent mixtures.

EXAMPLE 15

25 parts of the low-dust powder obtained in Example 13 are added a little at a time to a mixture of 70 parts of 1-methoxy-2-propanol and 5 parts of demineralized water with thorough stirring.

This results in a jet black solution which, after clarifying filtration, can be utilized for spray-dyeing wood or for dip- or knife-coating this material and which has high storage stability.

EXAMPLE 16

50 g/l of the dye powder prepared in Example 13 are added to a mixture of 50 parts of water and 50 parts of ethanol with stirring.

The result is a black solution which has a dissolution residue of only about 1% and which is highly suitable for spray-dyeing wood or for dyeing paper.

EXAMPLE e 468 g of nitramic acid are thoroughly stirred up in 2500 ml of water and mixed with 240 ml of half-concentrated hydrochloric acid; water and ice are added to a volume of 5000 ml at a temperature of 7° C.

600 ml of 3.33 normal sodium nitrite solution are added over 45 minutes; the diazotization is complete after 1 hour.

The diazo compound is then added over 20 minutes to a prepared solution of the coupling component produced by addition of 140 g of 50% strength sodium hydroxide solution to a suspension of 352 g of acetoacetanilide in 5000 ml of water.

The solution of the coupling component is buffered to a pH of 9.5 by addition of 120 g of sodium bicarbonate and adjusted with water and ice to a volume of 11000 ml at a temperature of 7° C.

The coupling reaction requires 30 minutes within which the batch may warm up to 15° C. A pH of 6.8 is set with 120 g of acetic acid, and the batch is further diluted to 18000 ml and heated to 80° C.

240 g of cobalt(II) chloride crystals are then added over 15 minutes, followed by 60 g of 30% strength aqueous hydrogen peroxide solution.

After a further 30 minutes of stirring at 80° C. and, if necessary, stabilization of the pH at 5.5 with acetic acid, the cobaltization is complete.

22000 g of a clear yellow solution comprising 4% of the 1:2 cobalt dye are obtained.

The solution is ultrafiltered to remove salt and to increase the concentration of the dye.

The 4000 g of retentate obtained comprise 23% of the dye.

EXAMPLE 17

The 4000 g of yellowish brown solution obtained in Example e are admixed with 5% of the desired end volume of butyldiglycol; 50 g of diatomaceous earth are then added a little at a time with stirring, and the batch is filtered through a polypropylene twill filter cloth clamped into a suction filter.

The filter residue is washed with about 4% of the sample volume of water, and the combined filtrates are then admixed with 7% of polyvinylpyrrolidone II in the form of its 50% strength aqueous solution in water.

Finally, the desired final color strength is set with a further 6% of demineralized water under attenuated total reflection (ATR) spectroscopic control.

This results in 5150 g of a yellowish brown dye solution which is stable in storage even at low temperatures; it is highly suitable for spray-dyeing leather and for drum dyeing same.

EXAMPLE f 250 g of Boeniger acid are suspended in 1000 ml of water and admixed with 30 g of ammonium sulfate. To this is added over 30 minutes the solution of the coupling component prepared by addition of 120 g of 50% strength sodium hydroxide solution to a suspension of 144 g of β-naphthol in 1000 ml of water.

The temperature of the coupling mixture which requires intensive stirring initially rises of its own accord and is then raised to 70° C. During the 1.5-hour coupling the pH is held at 10 by addition of a further 60 g of 50% strength sodium hydroxide solution.

20 g of salicylic acid are then added, and everything is admixed with 130 g of a basic chromium formate/sulfate having a chromium content of 20%. A pH of 4 is set, and then everything is heated to 100° C.; the batch dissolves over 2 hours as a 1:2 complex when a pH of 5 is maintained with 50% strength sodium hydroxide solution. Over a period of 12 hours, sufficient 25% strength sulfuric acid is then added dropwise, initially rapidly, then increasingly slowly, at reflux temperature for ultimately a pH of 1.5 to be achieved.

The precipitated suspension is, on a molar basis, a 50/50 mixture of the unchromed dye and of the 1:1 chromium complex dye and is isolated with the aid of a suction filter. Washing with demineralized water leaves a moist filter cake which has a weight of 1500 g and a solids content of 30%.

The paste is slurried up with 700 ml of demineralized water, admixed with 20 g of salicylic acid and, on heating to 90° C., admixed with sufficient 50% strength sodium hydroxide solution for everything to dissolve and a final pH of 6.5 to be obtained.

After 1.5 hours, 2350 g are obtained of a dark blue solution comprising 19% of the 1:2 chromium complex and having a salt content below 0.6%; the UV-VIS spectrum has maxima at 576 and 376 nm.

EXAMPLE 18

The 2350 g of the solution obtained in Example f are admixed with 3% of the desired end volume of butylglycol; then, at 80° C., 20 g of Arbocel® (filter aid) are stirred in a little at a time, and the batch is clarified by filtration through a polypropylene twill filter cloth clamped into a suction filter. The filter residue is washed with about 4% of the sample volume of demineralized water and 2% of polyvinylpyrrolidone IV are added in the form of its 50% strength solution in water.

Finally, the desired final color strength is set with about a further 4% of demineralized water under ATR spectroscopic control.

This affords 2700 g of a dark blue dye solution which is very stable in storage and which remains free flowing and readily pumpable at all application-relevant temperatures and which is superbly suitable for dyeing leather.

EXAMPLE 19

The 3500 g of the deep brown solution obtained in Example c are admixed with 5% of the desired end volume of butyldiglycol, followed at 80° C. by 50 g of diatomaceous earth stirred in, and the batch is clarified by filtration through a polypropylene twill filter cloth clamped into a suction filter.

The filter residue is washed with about 7% of the sample volume of demineralized water, and 5% of polyvinylpyrrolidone II are added in the form of its 50% strength solution in water.

Finally, the desired final color strength is set with about a further 7% of demineralized water under ATR spectroscopic control.

This affords 4400 g of a dark brown dye solution which is very stable in storage and pumpable and sprayable even at low temperatures and which is highly suitable for dyeing and spray-dyeing leather.

EXAMPLE 20

The 3500 g of the deep brown solution obtained in Example c are admixed with 3% of butyldiglycol and 3% of N-methylpyrrolidone. 50 g of Arbocell@ are then stirred in at 85° C., and the batch is clarified by filtration through a depth filter from Seitz clamped into a suction filter.

The filter residue is washed with about 6% of the sample volunme of demineralized water and 3% of polyvinylpyrrolidone V are added.

Finally, the desired final color strength is set with about 10% of the present volume of demineralized water, these samples taken from the batch being subjected to UV-VIS spectroscopic control.

This affords 4350 g of a dark brown, low-viscosity dye solution which, especially in mixtures with differently colored dye solutions, is suitable for leather finish dyeing and leather drum dyeing.

EXAMPLE 21

The 2500 g of the solution obtained in Example d are admixed at 85° C. with 4% of the desired end volume of polytetrahydrofuran of MW 250. 50 g of Celite® are then stirred in a little at a time, and the batch is clarified by filtration through a polypropylene twill filter cloth clamped into a suction filter. The filter residue is washed with about 4% of the sample volume of demineralized water and 1.5% of polyvinylpyrrolidone III are added in the form of its 30% strength solution in water.

Finally, the desired final color strength is-set with a further 4% or so of demineralized water under ATR spectroscopic control. This results in 2900 g of a very storage-stable jet black dye solution which is superbly suitable for dyeing leather and fur.

EXAMPLE 22

1. 2 parts of the liquid dye calculated on the basis of a 100% pure dye content are prediluted with 250 parts of cold distilled water and then, at 20° C., admixed with a further 200 parts of distilled water.

2. Dyeing method for chrome glove leather 100 parts of a conventionally produced, intermediately dried chrome sheep leather having a shaved thickness of about 0.8 mm were wetted back in 1000 parts of water at 30° C. with 2 parts of 25% strength ammonia and 1 part of an ethoxylated fatty amine by drumming for 120 minutes. After the liquor was dropped, 1000 parts of water at 30° C. were added, drumming was continued for 10 minutes, and the wash liquor was dropped. To effect dyeing, 600 parts of water and 6 parts of dye solution as per 1 were added at 60° C. and drummed in for 60 minutes. Thereafter 2 parts of 100% strength formic acid were added twice, and each addition was followed by a further 15 minutes of drumming. Thereafter the liquor was dropped. To effect cationic fixation, 600 parts of water and 0.3 part of 100% strength formic acid were added, and drumming was continued at 50° C. for 30 minutes. Thereafter 0.5 part of a commercially available cationic fixing agent was added for a further 30 minutes of drumming. Thereafter the liquor was dropped. The leather was rinsed cold, set out, hung up to dry and staked.

3. Dyeing method for vegetable/synthetic-retanned chrome cattle leather 100 parts of a conventionally tanned leather having a shaved thickness of 1.4 mm were initially washed with water at 30° C. for 10 minutes and then neutralized in 250 parts of water at 30° C. with 1 part of iron-free sodium formate and 1 part of sodium bicarbonate by drumming for 60 minutes. The leather was then washed with water at 30° C. for 10 minutes. Thereafter the retanning was effected in 200 parts of water at 30° C. using 3 parts of a commercially available synthetic tanning material and 3 parts of a commercially available vegetable tanning material. The leather was drummed for 60 minutes in the retanning liquor. The leather was then washed twice with 250 parts of water at 50° C. each time by drumming for 10 minutes, the liquor being subsequently dropped each time. To effect dyeing, 250 parts of water and 2 parts of dye solution as per 1 were added and drummed in at 50° C. for 60 minutes. To effect fatliquoring, 4 parts of a commercially available fatliquoring composition were then added and drummed in for a further 60 minutes. After addition of 1 part of 100% strength formic acid, drumming was continued for a further 60 minutes, and the liquor dropped. Thereafter the leather was rinsed cold, set out, dried, placed in sawdust, staked and dried in a toggling frame.

4. Dyeing method for purely synthetic-retanned chrome cattle leather 100 parts of a conventionally tanned leather having a shaved thickness of 1.4 mm were initially washed with water at 30° C. for 10 minutes and then neutralized in 250 parts of water at 30° C. with 1 part of iron-free sodium formate and 1 part of sodium bicarbonate by drumming for 60 minutes. The leather was then washed with water at 30° C. for 10 minutes. Thereafter the retanning was effected in 200 parts of water at 30° C. using 6 parts of a commercially available synthetic tanning material. The leather was drummed for 60 minutes in the retanning liquor. The leather was then washed twice with 250 parts of water at 50° C. each time by drumming for 10 minutes, the liquor being subsequently dropped each time. To effect dyeing, 250 parts of water and 2 parts of dye solution as per 1 were added and drummed in at 50° C. for 60 minutes. To effect fatliquoring, 4 parts of a commercially available fatliquoring composition were then added and drummed in for a further 60 minutes. After addition of 1 part of 100% strength formic acid, drumming was continued for a further 60 minutes, and the liquor dropped. Thereafter the leather was rinsed cold, set out, dried, placed in sawdust, staked and dried in a toggling frame.

5. Dyeing method for chrome cattle leather 100 parts of a conventionally tanned leather having a shaved thickness of 1.4 mm were initially washed with water at 30° C. for 10 minutes and then neutralized in 250 parts of water at 30° C. with 1 part of iron-free sodium formate and 1 part of sodium bicarbonate by drumming for 60 minutes. The leather was then initially washed with water at 40° C. for 10 minutes and thereafter with water at 50° C. for 10 minutes. To effect dyeing, 250 parts of water and 1 part of dye solution as per 1 were added and drummed in at 50° C. for 60 minutes. To effect fatliquoring, 4 parts of a commercially available fatliquoring composition were then added and drummed in for a further 60 minutes. After addition of 0.3 part of 100% strength formic acid, drumming was continued for a further 30 minutes, and the liquor dropped. Thereafter the leather was rinsed cold, set out, dried, placed in sawdust, staked and dried in a toggling frame.

6. Spray dyeing of cattle side leather with a purely aqueous spraying solution

The aqueous spraying solution was prepared by mixing 75 parts of dye solution as per Example 19 with 925 parts of distilled water. A piece of commercially available cattle side leather 12.5×18 cm in size was sprayed, on the leather surface, with 14 g of the aqueous spraying solution by means of spray gun. The leather was then dried at 20° C.

7. Spray dyeing of cattle side leather with solvent-comprising spraying solution The solvent-comprising spraying solution was prepared by mixing 75 parts of dye solution as per Example 21 with 325 parts of 1-methoxy-2-propanol. A piece of commercially available cattle side leather 12.5×18 cm in size was sprayed, on the leather surface, with 14 g of the aqueous spraying solution by means of a spray gun. The leather was then dried at 20° C.

The following dyes are likewise suitable for preparing mixtures according to this invention:

1:2 Chromium complex dyes of the azo dyes
        Nitramine acid→1-phenyl-3-methylpyrazolone
        Chloro-o-phenol acid→1-phenyl-3-methylpyrazolone
        Boeniger acid→1-phenyl-3-methylpyrazolone
        6-Nitro-Boeniger acid→α-naphthol
    1:2 Cobalt complex dye of the azo dye
        Picramic acid→2-amino-5-sulfonaphthalene
    1:2 Chromium complex dyes of the azo dyes
        6-Nitro-Boeniger acid→β-naphthol+Boeniger acid→β-naphthol and also
        Boeniger acid→βnaphthol 2-Amino-4-methoxy-5-chlorophenol-1-hydroxy-5-sulfonaphthalene

We claim:

1. A process for dyeing a substrate selected from the group consisting of wood, paper, leather and fir, comprising contacting said substrate with a liquid mixture comprised of a 1:2 metal complex dye which contains a sulfonic acid group or a salt thereof, and poly-N-vinylpyrrolidone or a copolymer of N-vinylpyrrolidone and vinyl acetate; and a solvent, wherein said 1:2 metal complex dye contains less than 3% by weight salt.

2. The process according to claim 1, wherein said solvent is selected from the group consisting of water, organic solvents and mixtures thereof.

3. The process according to claim 1, wherein said solvent is comprised of a mixture of water and organic solvent, wherein the weight ratio of water to organic solvent is greater than 1.

4. The process according to claim 1, wherein said poly-N-vinylpyrrolidone or copolymer of N-vinylpyrrolidone and vinyl acetate is present in an amount of from 1 to 12% by weight of the total weight of the liquid mixture.

5. The process according to claim 1, wherein said liquid mixture further comprises a dust-proofing agent.

6. The process according to claim 2, wherein said organic solvent is selected from the group consisting of glycols, glycols ethers, glycol esters, polyether alkanols derived from ethylene oxide or tetrahydrofuran, dimethylformamide, N-methylpyrrolidone and mixture thereof.

7. A process for dyeing a substrate selected from the group consisting of wood, paper, leather and fur, comprising dissolving a solid mixture comprising a 1:2 metal complex dye which contains a sulfonic acid group or a salt thereof and poly-N-vinylpyrrolidone or a copolymer of N-vinylpyrrolidone and vinyl acetate, with a solvent, to form a liquid mixture and contacting the substrate with the liquid mixture, wherein said 1:2 metal complex dye contains less than 3% by weight salt.

8. The process according to claim 7, wherein said solvent is selected from the group consisting of water, organic solvents and mixtures thereof.

9. The process according to claim 7, wherein said poly-N-vinylpyrrolidone or copolymer of N-vinylpyrrolidone and vinyl acetate is present inn amount of from 1 to 20% by weight of the total weight of the solid mixture.

10. The process according to claim 7, wherein said solid mixture further comprises a dust-proofing agent.

11. The process according to claim 8, wherein said organic solvent is selected from the group consisting of glycols, glycol ethers, glycol esters and mixtures thereof.

12. The process according to claim 7, wherein said solvent is comprised of a mixture of water and organic solvent, wherein the weight ratio of water to organic solvent is greater than 1.

* * * * *